US012499284B2

(12) United States Patent
Mayer et al.

(10) Patent No.: US 12,499,284 B2
(45) Date of Patent: Dec. 16, 2025

(54) TOOL SECURITY SYSTEM

(71) Applicant: Infineon Technologies AG, Neubiberg (DE)

(72) Inventors: Albrecht Mayer, Waakirchen (DE); Gasper Skvarc Bozic, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 223 days.

(21) Appl. No.: 18/327,909

(22) Filed: Jun. 2, 2023

(65) Prior Publication Data

US 2024/0403497 A1     Dec. 5, 2024

(51) Int. Cl.
*H04L 12/40*     (2006.01)
*G06F 21/85*     (2013.01)

(52) U.S. Cl.
CPC ........ *G06F 21/85* (2013.01); *H04L 12/40019* (2013.01)

(58) Field of Classification Search
None
See application file for complete search history.

(56) References Cited

U.S. PATENT DOCUMENTS

| | | | | |
|---|---|---|---|---|
| 6,934,817 | B2 * | 8/2005 | Ellison | G06F 12/1491 |
| | | | | 711/170 |
| 7,120,771 | B2 * | 10/2006 | Dahan | G06F 9/30047 |
| | | | | 711/163 |
| 8,521,969 | B2 * | 8/2013 | Dixon | G06F 21/79 |
| | | | | 711/E12.001 |
| 9,495,111 | B2 * | 11/2016 | Hars | G06F 21/85 |
| 10,223,290 | B2 * | 3/2019 | Depeyrot | G06F 12/1408 |
| 2009/0204823 | A1 * | 8/2009 | Giordano | G06F 11/3648 |
| | | | | 713/193 |

OTHER PUBLICATIONS

C166S On Chip Debug Support, User's Manual, V 1.1, Aug. 2001. Published by Infineon Technologies AG.
XMC(tm) and AURIX(tm)—industrial microcontrollers portfolio, document No. B158-110087-V5-7600-EU-EC-P. Published by Infineon Technologies AG in 2020.

* cited by examiner

*Primary Examiner* — Elias Mamo
(74) *Attorney, Agent, or Firm* — Eschweiler & Potashnik, LLC

(57) ABSTRACT

Systems, methods, and circuitries are disclosed for providing security for tool access in a device. In one example, a device includes a bus master, a memory protection unit, and protection agent circuitry. The bus master is configured to store, in a first range of memory locations, request messages received from a tool interface of the device, each request message encapsulating a tool-related command. The memory protection unit is configured to prevent the bus master from accessing memory locations outside of the first range of memory locations. The protection agent circuitry is configured to access the first range of memory locations to identify one or more request messages, and send each respective request message to one of a plurality of component circuitries based on a component circuitry identified by the request message.

20 Claims, 3 Drawing Sheets

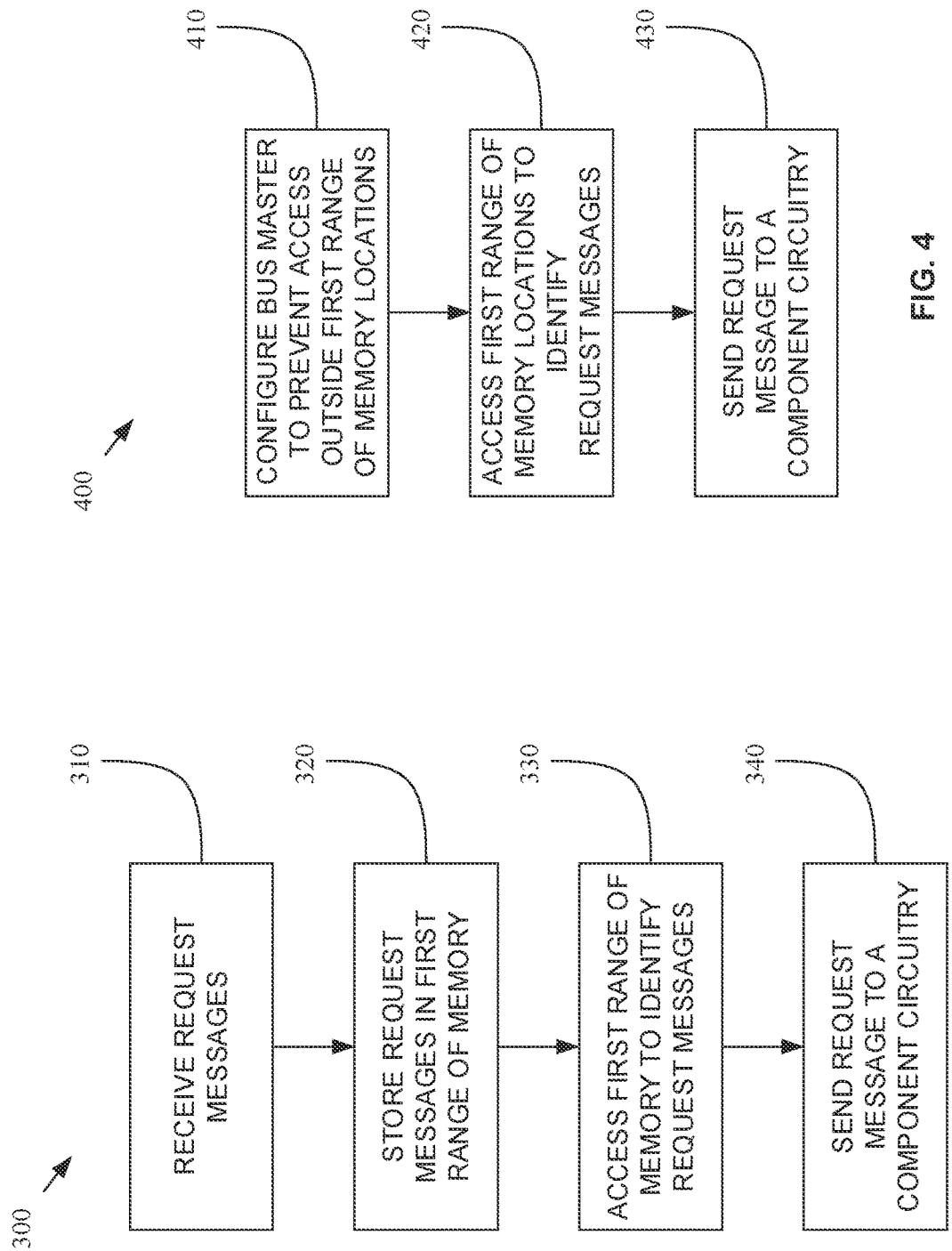

TOOL SECURITY SYSTEM

FIELD

The present disclosure relates generally to the field of processors and central processing units (CPUs) and more particularly to external tools used to access an integrated circuit during development and troubleshooting.

BACKGROUND

External software development and debugging tools are configured to be coupled to a specialized hardware interface on an integrated circuit (IC) device like a microcontroller unit (MCU), a microprocessor unit (MPU), or a system-on-chip (SoC).

BRIEF DESCRIPTION OF THE DRAWINGS

Some examples of circuits, apparatuses and/or methods will be described in the following by way of example only. In this context, reference will be made to the accompanying Figures.

FIG. 3 is a flow diagram outlining an exemplary method of processing requests from a tool, in accordance with various aspects described.

FIG. 4 is a flow diagram outlining an exemplary method of processing requests from a tool, in accordance with various aspects described.

DETAILED DESCRIPTION

Figure 1:
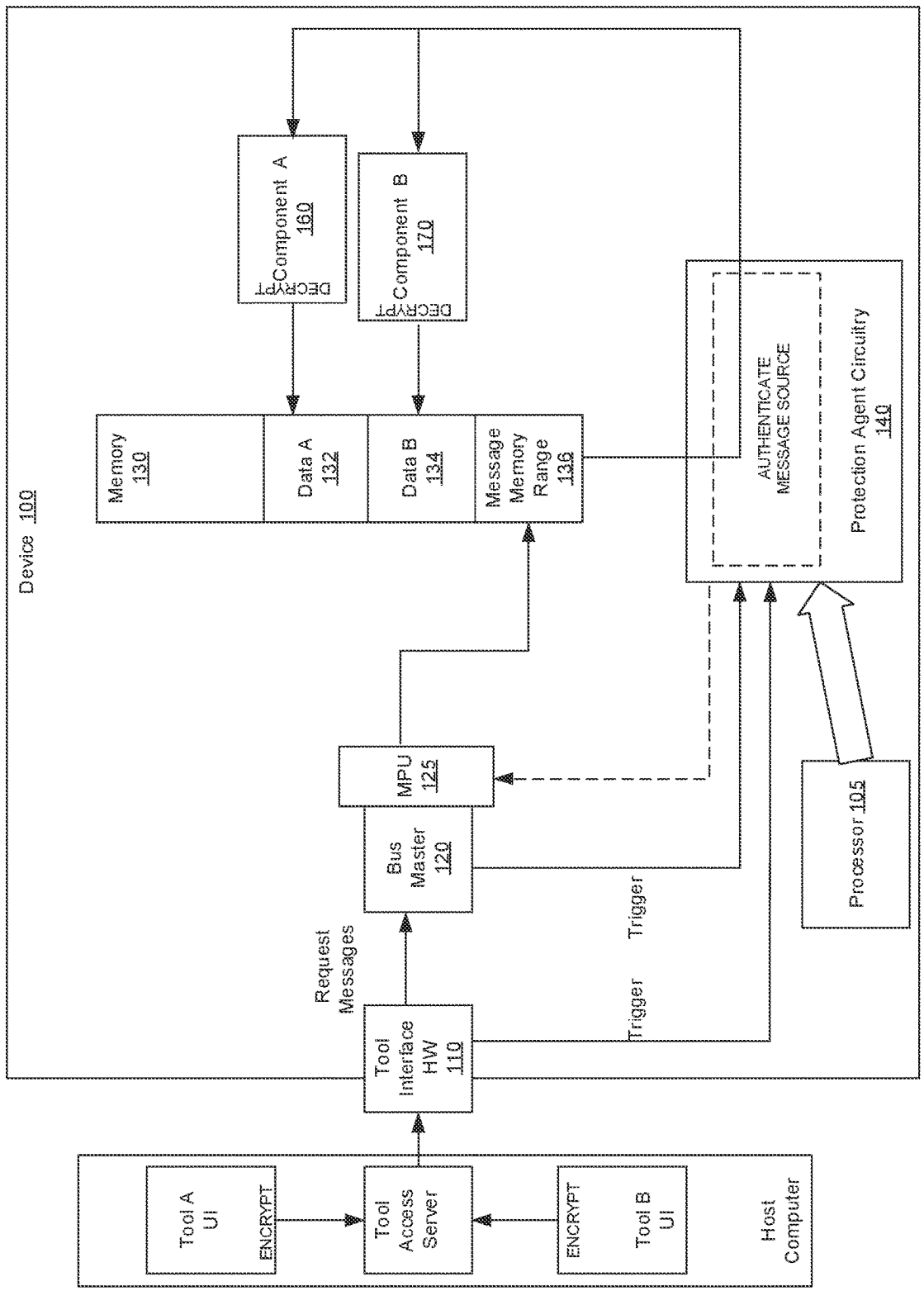
FIG. 1 is a block diagram of an exemplary architecture in which a protection agent limits access by a tool to a prescribed range of memory locations, in accordance with various aspects described.

The present disclosure is described with reference to the attached figures. Similar components in various figures may be represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Integrated circuits include many components that are not readily accessible by external means during normal operation. To facilitate programming, development, and debugging of integrated circuits, specialized tools have been developed. A tool is a device that includes a user interface, such as a host computer, through which a user may enter tool-related commands and read results. The tool includes a specialized hardware interface configured to mechanically and electrically couple with the integrated circuit often through a special tool port. The tool-enabled integrated circuit includes pathways and connections through which the tool may access circuits like memories, registers and dedicated tool circuits like breakpoint units, trace units, and overlay units.

Examples of tool ports include Joint Test Action Group (JTAG, IEEE), Device Access Port (DAP, Infineon), and Serial-Wire Debug (SWD, ARM). Each tool type communicates with the IC according to a tool interface specific protocol that may convert tool commands to serial communication via the few interface pins of the tool port. Tools may be used for debugging, measuring, calibrating, or flashing an integrated circuit.

The specialized user and hardware interface of the tool may provide some level of security against unauthorized access to the integrated circuit via the tool. For example, the user interface may include password protection and/or challenge/response authentication measures. However, once a tool has gained access to an integrated circuit, any tool enabled circuit or memory may be accessed. The memory may store instructions and data used in implementing different software components (e.g., applications or features) of the device. As used herein a device component includes any hardware or memory associated particularly with a given application or feature supported by the device 100. In the case when different device components are supplied by different vendors, a user of the tool has access to potentially proprietary information of the different vendors. Further, tool commands are not encrypted meaning that any key exchanges occur on an unencrypted channel and can be stolen.

Described herein are systems, circuitries, and methods for providing granular tool access to integrated circuit memory. Systems, circuitries, and methods disclosed herein also support authentication and encryption of tool commands for additional security.

Granular Memory Access by Tools

FIG. 1 illustrates an integrated circuit device 100 that includes processor 105, tool interface hardware 110, a bus master 120, and memory 130. The memory 130 includes a range of memory locations 132 allocated to a first device component A, a range of memory locations 134 allocated to a second device component B, and a range of memory locations 136 allocated for storing messages received from and sent to the tool interface hardware 110. In some examples, the range of memory locations 132, 134, 136 do not overlap.

Device components A and B may be related to different applications of the device 100, supplied by different vendors, or characterized as A or B based on some other criteria. Separate component circuitry is provided for each device component. Component circuitry 160 is configured to execute tool-related commands associated with component A and may access (e.g., read or write) memory locations in the memory range 132. Component circuitry 170 is configured to execute tool-related commands associated with component B and may access (e.g., read or write) memory locations in the memory range 134. In one example, the component circuitries comprise the processor 105 or set of hardware components of the device 100 executing stored (e.g., on computer-readable medium or memory 130) computer-executable instructions for performing operations associated with particular device components A or B.

A host computer provides two tool user interfaces, a tool A user interface used to interact with software component A and a tool B user interface used to interact with software component B. Each tool user interface receives tool-related commands for a given component (e.g., read or write commands for specific memory locations, interrupts, and so on) from a user. Based on which tool user interface generated the tool-related command, the tool access server converts the tool-related commands into request messages addressed or otherwise indicated as being intended for either tool A or tool B (e.g., via a destination indicator in a header or control element). The tool access server provides the request messages to the device 100 via the specialized tool interface hardware 110. There is a protocol between the tool and each device component that allows tool commands to be encapsulated in request messages.

The bus master 120 receives the request messages and stores them in the message memory range 136. To prevent unfettered access to device memory by the bus master 120, a memory protection unit (MPU) 125 prevents the bus master from accessing any memory location outside of the message memory range 136. In this manner, a command to access a memory location outside the range 136 will not be executable by the bus master 120. In one example, the MPU 125 is programmable with a base address and a range and includes a hardware comparator that is used to compare a command's destination address with the programmed range. When the destination address is not in the range, the read or write operation in the command is prevented, by hardware, from execution.

While in the illustrated example, there is a single message memory range 136, in other examples there may be more than one memory range used for storing request messages. For example a different message memory range may be allocated for each component circuitry. The MPU 125 may be capable of enforcing an access restriction outside of any of these multiple different ranges.

Protection agent circuitry 140 sets the range of allowed memory addresses for the MPU 125 to correspond to the message memory range 136. The protection agent circuitry 140 may in this manner control the size of the message memory range based on loading.

The protection agent circuitry 140 has access to the message memory range 136 and sends or routes request messages stored therein to the respective component circuitry indicated in the respective request messages. In one example, the protection agent circuitry 140 is configured to transfer or route the request messages based on the message header and does not need to read or interpret the commands in the payload of the request messages. This means that even if the message payloads are encrypted, the protection agent circuitry 140 is still capable of routing messages to the appropriate component circuitry.

In some examples, the protection agent circuitry 140 has privilege to access the message memory range 136 and respective queues (not shown) for the component circuitries. In these examples, the protection agent circuitry 140 reads a request message header and copies the message to a queue associated with the indicated component circuitry. In one example, the protection agent circuitry 140 comprises the processor 105 or set of hardware components of the device 100 executing stored (e.g., on computer-readable medium or memory 130) computer-executable instructions for performing operations disclosed herein as being performed by the protection agent circuitry.

The protection agent circuitry 140 may be configured to periodically check the memory message range 136 for request messages. In another example, the tool interface hardware 110 or bus master 120 triggers the protection agent circuitry when a request message has been sored. For example, the tool interface hardware 110 or the bus master 120 may generate an interrupt when a request message is received or stored in the message memory range. The interrupt causes the protection agent circuitry 140 to check the message memory range for messages.

Each component circuitry 160, 170 receives request messages from the protection agent circuitry 140 (e.g., by way of a queue) and, based on the message, performs the encapsulated tool-related command including accessing the associated memory range.

Figure 2:
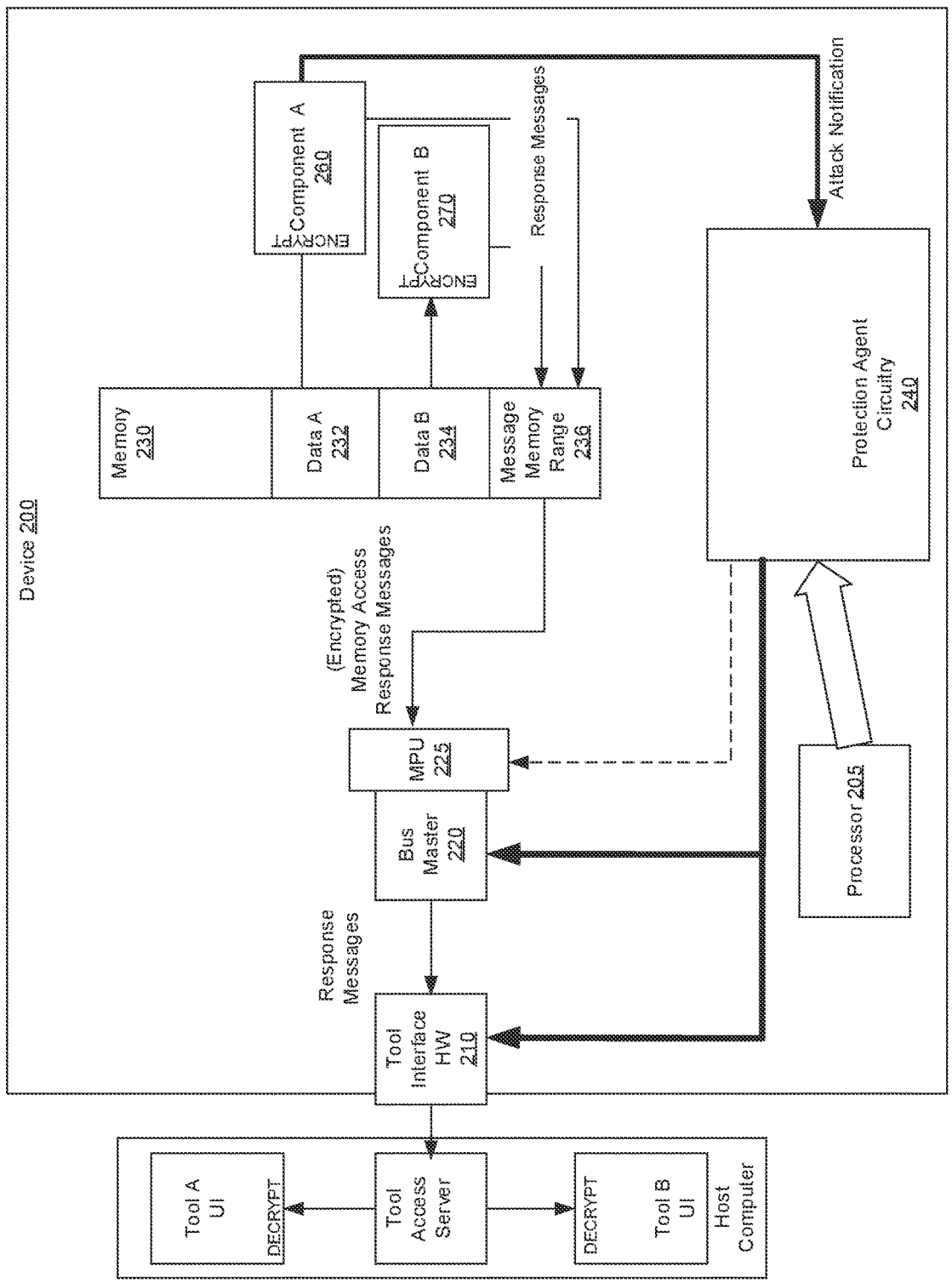
FIG. 2 is a block diagram of an exemplary architecture in which a protection agent limits access by a tool to a prescribed range of memory locations, in accordance with various aspects described.

FIG. 2 illustrates an example device 200 that includes protection agent circuitry 240 that limits access of a tool to specific areas of memory. The device includes processor 205, tool interface hardware 210, bus master 220, MPU 225, memory 230, and component circuities 260, 270. The component circuitries 260, 270, after executing tool-related command of a request message, encapsulate results in a response message. The component circuitries store the response messages in the message memory range 236. The component that generated the response message may be referenced in the response message (e.g., in a header or control element).

Under control of the tool interface HW 210, the bus master 220 reads the message memory range, containing the response messages, for the tool access server. The tool access server routes the read response messages to the associated tool user interfaces.

Encryption and Authentication

In addition to providing granular access to device memory, encryption and/or authentication of tool-related messages may also be provided by the illustrated systems. Referring to FIG. 1, the tool user interfaces may encrypt the payload of the request messages using respective encryption keys known to the corresponding component circuitries. For example, tool A user interface and component circuitry 160 may share a key that is different from a key shared by tool B user interface and component circuitry 170. The encrypted messages are stored in the message memory range 136 and routed to component circuitry 160 or 170 by the protection agent circuitry 140. The access protection circuitry decrypts the request messages for execution. As can be seen in FIG. 2, the component circuitries may encrypt the response messages, which are stored in the message memory range and transmitted to the tool user interfaces via the bus master and the tool hardware interface. In this manner, the tool-related messages are encrypted end-to-end and the protection agent circuitry is not able to decode the payload of the messages it routes.

In addition to or instead of encryption on a per component basis, the disclosed systems may provide authentication services in which a source of the request messages (e.g., a particular tool user interface) provides an authentication certificate or other credential to the protection agent circuitry at initial connection. When the source has been authenticated a session key that identifies the source may be shared between the source and the component circuitries. The session key may be generated using a random number generator. The payload of the request messages may include this session key or be encrypted based on the session key to indicate that the source was properly authenticated. The request message header may be unencrypted and/or without a session key in one example, to simplify operation of the protection agent circuitry.

In addition to authenticating the source of the message, the component circuitries may enforce levels of authorization associated with the authenticated message source. For example, some tools for component A may be authorized for reading memory only while other tools for component A may be authorized for resetting, writing, interrupts, and so on. This feature is supported because the component circuitries are able to determine, through the session key associated with a request message payload, an identity of a tool transmitting the request messages. In this manner, interrupts or other potentially damaging tool-related commands may be prevented from execution when a source of the commands cannot be authenticated or is not authorized to make the commands.

An additional feature supported by the protection agent circuitry is a security shutdown when an attack notification is received from any device component. As shown in bold in FIG. 2, an attack notification may be generated by a component circuitry (e.g., 260) that detects more than a threshold number of improperly encrypted or unauthenticated messages. In response to an attack notification, the protection agent circuitry may block access to the IC by the tool access HW 210 or control the MPU 225 to block access to any memory locations in the memory 230. This prevents execution of any potentially damaging commands when an attack is suspected.

One benefit of the disclosed architecture is that the same physical architecture and components may be used independent of whether encryption and/or authentication are provided. This provides flexibility when configuring tool access and allows for an upgrade to encryption and authentication when desired.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

FIG. 3 is a flow diagram outlining an example method 300 for processing messages encapsulating tool-related commands. At 310, the method includes, with a bus master (e.g., bus master 120, 220 of FIGS. 1, 2), receiving a request messages from a tool interface. Each request message encapsulates a tool-related command. Tool-related commands may include a request to read from memory or a register, a request to write to memory or a register, an interrupt, and so on. Each request message is generated by a tool user interface associated with a component circuitry. At 420, the method includes, with the bus master, storing the request messages in a first range of memory locations.

At 330, the method includes, with protection agent circuitry (e.g., 140, 240 of FIGS. 1, 2), accessing the first range of memory locations to identify one or more request messages. In one example, the method includes accessing the first range of memory periodically according to a polling schedule and in another example the method includes accessing the first range of memory in response to an interrupt signal.

At 340, the method includes, with the protection agent circuitry, sending each request message to one of a plurality of component circuitries based on a component circuitry identified by the request message.

In one example, the method further includes, with the protection agent circuitry, configuring the bus master to prevent the bus master from accessing memory locations outside of the first range of memory locations.

FIG. 4 is a flow diagram outlining an example method 400 that may be performed, for example by protection agent circuitry (e.g., 140, 240 of FIGS. 1, 2). The method includes, at 410, configuring a bus master to prevent the bus master from accessing memory locations outside of a first range of memory locations. In one example, the configuration is performed by setting, on hardware-based memory protection unit, a range of addresses that are excluded from access by the bus master. The method includes, at 420, accessing the first range of memory locations to identify one or more request messages. In some examples, the method includes periodically accessing the first range of memory locations according to a polling schedule. In some examples, the method includes accessing the first range of memory location in response to an interrupt. The method includes, at 430, sending each request message to one of a plurality of component circuitries based on a component circuitry identified in a header of the request message. In some examples, the method includes copying the request messages into queues associated with respective indicated component circuitries.

EXAMPLES

Example 1 is a device including a bus master, a memory protection unit, and protection agent circuitry. The bus master is configured to store, in a first range of memory locations, request messages received from a tool interface of the device, each request message encapsulating a tool-related command. The memory protection unit is configured to prevent the bus master from accessing memory locations outside of the first range of memory locations. The protection agent circuitry is configured to access the first range of memory locations to identify one or more request messages, and send each respective request message to one of a plurality of component circuitries based on a component circuitry identified by the request message.

Example 2 includes the subject matter of example 1, including or omitting optional elements, wherein the protection agent circuitry is configured to control a range of memory locations protected by the memory protection unit.

Example 3 includes the subject matter of example 1, including or omitting optional elements, wherein the bus master is configured to access the first range of memory locations to identify one or more response messages, and provide the one or more response messages to the tool interface of the device.

Example 4 includes the subject matter of example 1, including or omitting optional elements, wherein the protection agent circuitry accesses the first range of memory periodically according to a polling schedule.

Example 5 includes the subject matter of example 1, including or omitting optional elements, wherein the protection agent circuitry accesses the first range of memory in response to an interrupt signal.

Example 6 includes the subject matter of example 1, including or omitting optional elements, further including the plurality of component circuitries, wherein each component circuitry is configured to receive a request message from the protection agent circuitry, execute the tool-related command encapsulated by the request message by accessing a respective range of memory locations allocated for the component circuitry, generate a response message encapsulating results of the tool-related command, and store the response message in the first range of memory addresses.

Example 7 includes the subject matter of example 1, including or omitting optional elements, wherein each request message is encrypted using a key known by a component circuitry identified in the request message.

Example 8 includes the subject matter of example 1, including or omitting optional elements, wherein each request message includes is encrypted with a session key that indicates an authenticated identity of a source of the request message.

Example 9 includes the subject matter of example 1, including or omitting optional elements, wherein each component circuitry is configured to decrypt a received request message using a key known by a tool associated with the component circuitry or encrypt a response message using a key known by a tool associated with the component circuitry.

Example 10 includes the subject matter of example 1, including or omitting optional elements, wherein the protection agent circuitry is configured to, in response to an attack notification signal, control the memory protection unit to prevent the bus master from accessing any memory locations.

Example 11 is a method, including, with a bus master, receiving a request messages from a tool interface, each request message encapsulating a tool-related command, and storing the request messages in a first range of memory locations. The method includes, with protection agent circuitry, accessing the first range of memory locations to identify one or more request messages, and sending each request message to one of a plurality of component circuitries based on a component circuitry identified by the request message.

Example 12 includes the subject matter of example 11, including or omitting optional elements, including, with the protection agent circuitry, configuring the bus master to prevent the bus master from accessing memory locations outside of the first range of memory locations.

Example 13 includes the subject matter of example 12, including or omitting optional elements, including, in response to receiving an attack notification signal, with the protection agent circuitry, configuring the bus master to prevent the bus master from accessing any memory locations.

Example 14 includes the subject matter of example 11, including or omitting optional elements, including accessing the first range of memory periodically according to a polling schedule.

Example 15 includes the subject matter of example 11, including or omitting optional elements, including accessing the first range of memory in response to an interrupt signal.

Example 16 includes the subject matter of example 11, including or omitting optional elements, wherein each request message is encrypted using a key known by a component circuitry identified in a header of the request message or a session key that indicates an authenticated source of the request message.

Example 17 is a computer-readable medium having computer-executable instructions stored thereon that when executed by a processor, cause the processor to perform corresponding operations. The operations include configuring a bus master to prevent the bus master from accessing memory locations outside of a first range of memory locations; accessing the first range of memory locations to identify one or more request messages; and sending each request message to one of a plurality of component circuitries based on a component circuitry identified in a header of the request message.

Example 18 includes the subject matter of example 17, including or omitting optional elements, wherein the instructions include instructions that cause the processor to, in response to receiving an attack notification signal, configure the bus master to prevent the bus master from accessing any memory locations.

Example 19 includes the subject matter of example 17, including or omitting optional elements, wherein the instructions include instructions that cause the processor to access the first range of memory periodically according to a polling schedule.

Example 20 includes the subject matter of example 17, including or omitting optional elements, wherein the instructions include instructions that cause the processor to access the first range of memory in response to an interrupt signal.

It can be seen from the foregoing description that limiting the access of a bus master that receives tool-related request messages to a range of memory reserved for storing the messages and employing a security agent to retrieve and route the messages from the range of memory to the appropriate components within a device provides protection against unauthorized access of device components by an external tool.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide safety management on a per-application group basis according to embodiments and examples described herein.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC.

What is claimed is:

1. A device, comprising:
   a plurality of component circuitries;
   a bus master configured to store, in a first range of memory locations, request messages received from a tool interface of the device, each request message encapsulating a tool-related command;
   a memory protection unit configured to prevent the bus master from accessing memory locations outside of the first range of memory locations; and
   protection agent circuitry configured to
      access the first range of memory locations to identify one or more request messages, and
      send respective request messages to one of a plurality of component circuitries based on a component circuitry identified by the request message,
   wherein each component circuitry is configured to
      receive a request message from the protection agent circuitry;
      execute the tool-related command encapsulated by the request message; and
      store a response message encapsulating results of the tool-related command in the first range of memory addresses.

2. The device of claim 1, wherein the protection agent circuitry is configured to control a range of memory locations protected by the memory protection unit.

3. The device of claim 1, wherein the bus master is configured to
   access the first range of memory locations to identify one or more response messages, and
   provide the one or more response messages to the tool interface of the device.

4. The device of claim 1, wherein the protection agent circuitry accesses the first range of memory periodically according to a polling schedule.

5. The device of claim 1, wherein the protection agent circuitry accesses the first range of memory in response to an interrupt signal.

6. The device of claim 1, wherein at least one request message is encrypted using a key known by a component circuitry identified in the request message.

7. The device of claim 1, wherein at least one request message is encrypted with a session key that indicates an authenticated identity of a source of the request message.

8. The device of claim 1, wherein at least one component circuitry is configured to decrypt a received request message using a key known by a tool associated with the component circuitry or encrypt a response message using a key known by a tool associated with the component circuitry.

9. The device of claim 1, wherein the protection agent circuitry is configured to, in response to an attack notification signal, control the memory protection unit to prevent the bus master from accessing any memory locations.

10. A method, comprising:
   with a bus master,
      receiving a request messages from a tool interface, each request message encapsulating a tool-related command, and
      storing the request messages in a first range of memory locations; and
   with protection agent circuitry,
      accessing the first range of memory locations to identify one or more request messages, and
      sending respective request messages to one of a plurality of component circuitries based on a component circuitry identified by the request message; and
   with a component circuitry,
      receiving a request message from the protection agent circuitry;

executing the tool-related command encapsulated by the request message; and storing a response message encapsulating results of the tool-related command in the first range of memory addresses.

11. The method of claim 10, comprising, with the protection agent circuitry, configuring the bus master to prevent the bus master from accessing memory locations outside of the first range of memory locations.

12. The method of claim 11, comprising, in response to receiving an attack notification signal, with the protection agent circuitry, configuring the bus master to prevent the bus master from accessing any memory locations.

13. The method of claim 10, comprising accessing the first range of memory periodically according to a polling schedule.

14. The method of claim 10, comprising accessing the first range of memory in response to an interrupt signal.

15. The method of claim 10, wherein at least one request message is encrypted using a key known by a component circuitry identified in a header of the request message or a session key that indicates an authenticated source of the request message.

16. A non-transitory computer-readable medium having computer-executable instructions stored thereon that when executed by a processor, cause the processor to perform corresponding operations, the operations comprising:

configuring a bus master to prevent the bus master from accessing memory locations outside of a first range of memory locations, the bus master coupled to a tool hardware interface of a device;

accessing the first range of memory locations to identify one or more request messages;

sending each request message to one of a plurality of component circuitries based on a component circuitry identified in a header of the request message; and in response to receiving an attack notification signal, configure the bus master to prevent the bus master from accessing any memory locations.

17. The non-transitory computer-readable medium of claim 16, wherein the instructions include instructions that cause the processor to access the first range of memory periodically according to a polling schedule.

18. The non-transitory computer-readable medium of claim 16, wherein the instructions include instructions that cause the processor to access the first range of memory in response to an interrupt signal.

19. The non-transitory computer-readable medium of claim 16, wherein the instructions include instructions that cause the processor to send each request message to the one of the plurality of component circuitries without reading a payload of the request message.

20. The non-transitory computer-readable medium of claim 16, wherein the instructions include instructions that cause the processor to copy each request message into a queue associated with the one of the plurality of component circuitries.

* * * * *